United States Patent [19]

Balaschak et al.

[11] Patent Number: 5,616,829
[45] Date of Patent: Apr. 1, 1997

[54] ABNORMALITY DETECTION/SUPPRESSION SYSTEM FOR A VALVE APPARATUS

[75] Inventors: James J. Balaschak, Duxbury, Mass.;
Masatsugu Fujio, Fukuoka, Japan;
Keiichiro Hayashi, Fukuoka, Japan;
Masatoshi Okano, Fukuoka, Japan;
David E. Thrall, Marion, Mass.

[73] Assignee: Teledyne Industries Inc., Los Angeles, Calif.

[21] Appl. No.: 401,469

[22] Filed: Mar. 9, 1995

[51] Int. Cl.$^6$ .................... F16K 31/05; F16K 13/04; G01M 3/08

[52] U.S. Cl. ................ 73/46; 73/40.5 R; 73/862.29; 73/862.541; 137/551; 251/20; 251/161; 251/129.02

[58] Field of Search .................... 73/46, 40.5 R, 73/47, 862.29, 862.31, 862.49, 862.54; 137/554, 75; 251/20, 27, 233, 183, 161, 85, 129.19, 129.02

[56] References Cited

U.S. PATENT DOCUMENTS

| | | | |
|---|---|---|---|
| Re. 32,880 | 2/1989 | Lapeyre | 251/46 |
| 4,132,237 | 1/1979 | Kennedy et al. | 137/75 |
| 4,276,906 | 7/1981 | Eguchi | 137/625.38 |
| 4,488,702 | 12/1984 | Lapeyre | 251/46 |
| 4,660,416 | 4/1987 | Charbonneau et al. | 73/168 |
| 4,736,763 | 4/1988 | Britton et al. | 173/10 |
| 4,879,901 | 11/1989 | Leon | 73/168 |
| 4,895,018 | 1/1990 | Asbra | 73/40.5 R |
| 4,898,022 | 2/1990 | Yumoto et al. | 73/46 |
| 4,901,751 | 2/1990 | Story et al. | 137/312 |
| 4,930,748 | 6/1990 | Gonsior | 251/163 |
| 5,090,239 | 2/1992 | Balaschak et al. | 73/168 |
| 5,146,791 | 9/1992 | Peter et al. | 73/862.49 |
| 5,263,682 | 11/1993 | Covert et al. | 251/214 |
| 5,305,637 | 4/1994 | Bauer | 73/168 |
| 5,469,737 | 11/1995 | Smith et al. | 73/168 |

Primary Examiner—Hezron E. Williams
Assistant Examiner—J. David Wiggins

[57] ABSTRACT

Provision of an abnormality detection and suppression system for a valve apparatus, which is capable of detecting abnormal states such as leakage through valve seats or a gland/packing assembly and coping with the abnormality while ensuring protection for the valve apparatus by controlling a driving unit for a valve stem on the basis of information as detected, by means of a vibration sensor, a temperature sensor and a strain sensor are disposed internally of a valve stem 4 at a portion thereof which lies outside of a valve casing of the valve apparatus. When vibration of the valve stem brought abut by leakage through valve seats is detected by the vibration sensor in a fully closed state of the valve apparatus, a valve body thereof is driven further in the valve closing direction by a driving unit 13 controlled by a control unit, both being disposed externally of the valve casing, until the leakage and thus the vibrations disappear while monitoring simultaneously a load applied to the stem by the strain sensor. On the other hand, when a temperature change of the stem is detected by the temperature sensor in the fully open state of the valve apparatus, the control unit decides that the temperature change is due to leakage through a gland/packing assembly 12 of the valve apparatus to thereby control the driving unit so that the stem is driven to move the valve body in the valve opening direction while monitoring simultaneously a load applied to the stem until the change in the temperature is canceled out.

7 Claims, 2 Drawing Sheets

ABNORMALITY DETECTION/SUPPRESSION SYSTEM FOR A VALVE APPARATUS

FIELD

The present invention relates to a valve apparatus suitable for use in a plant such as, for example, a nuclear power plant or the like in which steam of a high temperature and a high pressure is processed or handled. More specifically, the invention is concerned with an abnormality detection system for the valve apparatus in which sensors for detecting abnormality such as leakage of a fluid flowing through the valve apparatus are provided in association with a stem of the valve apparatus.

BACKGROUND

As the method known heretofore for diagnosing a valve apparatus as to occurrence of abnormality, there may be mentioned a method according to which a current and/or voltage of an electric power required for driving a stem coupled directly to a valve body (also referred to as the valve element) of the valve apparatus is measured upon a routine inspection thereof for thereby detecting a load acting on the stem, wherein existence of abnormality in the valve as well as in a stem driving unit is detected by making use of load information obtained in this way.

As a typical example of such abnormality, there may be mentioned fluid leakage through valve seats (also referred to as the inter-seat leakage). In that case, occurrence or existence of the inter-seat leakage is determined on the basis of vibration as detected. To this end, such an arrangement has heretofore been adopted in which a vibration sensor is mounted on the stem at the top end thereof for detecting vibration due to fluid flow through a valve body interlocked to the stem. Alternatively, the vibration sensor may be disposed in physical contact with an outer wall of the valve casing.

However, the conventional method mentioned above is disadvantageous in that because a great distance usually intervenes between the vibration sensor and the valve seats which constitute a source of vibration or because the measurement of the vibration is performed rather indirectly at a location deviated considerably from the vibration source, not only is great difficulty encountered in detecting the vibration with desired accuracy but also utility for practical applications is very poor because of incapability of making available other information than that of leakage, providing thus no remarkable contribution to enhancement of operation performance of the valve apparatus.

Besides, because the vibration sensor is not mounted integrally with the stem, it is impossible to calibrate the vibration sensor at the time of fabrication of the stem. Consequently, every time vibration is detected and necessity for identifying the cause for the vibration arises, the plant or an associated part thereof has to be once shut down to apply a reference vibration to the valve apparatus for calibrating the vibration sensor in order to decide what is indicated by the vibration detected by the vibration sensor.

Further, it is observed that the existing system includes no means for obtaining various information through the medium of temperature of a fluid being processed. Furthermore, since the temperature sensor is not permanently installed, problems arise in respect to the calibration and the processing of the signal delivered from the temperature sensor as in the case of the vibration sensor. It should further be added that although the information can be evaluated individually, synthetic evaluation is rendered impractical or impossible.

Under the circumstances, there exists a great demand for an abnormality detection apparatus or system which is capable of not only detecting leakages through the valve seats and the gland/packing assembly but also processing the information as obtained to thereby control the driving unit on the basis of the information as processed without need for shutting down the plant operation for evaluation of the information so that leakage can be coped with the valve apparatus by itself without resorting to other measures or external facilities.

SUMMARY

In the light of the state of the art described above, it is a primary object of the present invention to provide an abnormality detection and suppression system for a valve apparatus, which system is capable of detecting vibration of a valve body which occurs due to inter-seat leakage in a fully closed state thereof to thereby prevent the leakage by driving a valve stem such that the valve body is further moved in the valve closing direction, while upon occurrence of leakage of fluid through a gland/packing assembly in the fully open state, a temperature rise of the stem due to the leakage is detected to drive the stem further in the valve opening direction for thereby causing a surface contact pressure to act more intensively on the back seats provided in the valve apparatus in order to suppress or stop the leakage.

Another object of the present invention is to provide an abnormality detection and suppression system for a valve apparatus, which system is adapted to measure a load applied to the stem during the period in which the leakage suppressing operation mentioned above is being conducted and compare the load as measured or detected with a preset maximum permissible load applicable to the stem and set previously to increase the load applied to the stem within a permissible range of load for thereby suppressing the fluid leakage through the valve seats and/or the gland/packing assembly.

It is yet another object of the present invention to provide an abnormality detection and suppression system for a valve apparatus, in which when the leakage can not be stopped nevertheless of application of load to the stem up to a level of the maximum permissible load, corresponding information indicative of this fact or event is stored in a memory of a microcomputer constituting the control unit and read out onto a display unit, as occasion requires, so that it can be utilized as the information indicating a defect such as damage or injury of the valve seats and the back seats upon servicing the valve apparatus in a valve inspection routine and the like maintenance procedure.

Further, it is an object of the present invention to provide an abnormality detection and suppression system for a valve apparatus, which system is also capable of coping with such an abnormal phenomenon or event that a valve body or element is stickily embraced or sandwiched between the valve seats due to an abnormally high pressure and high temperature prevailing within the valve casing by making use of a strain sensor provided for use in the operation for suppressing or stopping the leakage through the valve seats and/or the gland/packing assembly.

In view of the objects mentioned above, the present invention is directed to a valve apparatus which is comprised of a valve casing in which a fluid passage having first valve seats installed therein is defined, a valve body movable between a fully open position and a fully closed position for selectively opening or closing the fluid passage, the valve body having second valve seats mounted thereon and adapted to selectively engage with the first valve seats in a fluid-tight manner, a stem having one end portion coupled to the valve body integrally therewith and other end portion extending through a gland/packing assembly of the valve casing to the exterior thereof, and a driving unit operatively connected to the stem at a location externally of the valve casing so as to move the valve body between the fully open position and the fully closed position. According to an aspect of the present invention, there is provided an abnormality detection and suppression system for the valve apparatus mentioned above, which system is characterized in that a vibration sensor, a temperature sensor and a strain sensor are disposed internally of the stem at a portion thereof which lies outside of the valve casing when the valve body assumes the fully closed position, and that a control unit is disposed externally of the valve casing and adapted to receive output signals from the vibration sensor, the temperature sensor and the strain sensor, wherein when the valve body is at the fully closed position, the control unit responds to the output signal of the vibration sensor indicating vibration due to leakage through the valve seats to thereby actuate the driving unit such that the valve body is further driven in the valve closing direction from the fully closed position by means of the stem while monitoring simultaneously a load applied to the stem with the aid of the strain sensor until substantially no vibration is detected by the vibration sensor, whereas when the temperature sensor detects a temperature change in the state in which the valve body is at the fully open position, the control unit responds to the output signal of the temperature sensor indicative of leakage through the gland/ packing assembly to thereby actuate the driving unit such that the valve body is further driven in the valve opening direction through the stem, while monitoring simultaneously a load applied to the stem with the aid of the strain sensor, until the temperature change is substantially suppressed.

In a preferred mode for carrying out the invention, the abnormality detecting system may feature that a portion of the stem at which the driving unit is operatively coupled to the stem is implemented in the form of a threaded portion provided in the outer peripheral surface of the stem and that the temperature sensor and the strain sensor are disposed within an outer peripheral recess formed in the stem in the vicinity of a lower end of the threaded portion, being covered by a coating material. Further, in another preferred mode for carrying out the invention, a signal wire passage may be formed in a center portion of the stem so as to extend coaxially with the stem from a position close to the lower end of the threaded portion to a top of the other end portion of the stem and that the vibration sensor is fixedly secured to a bottom of the signal wire passage by an adhesive and enclosed by a heat insulating material. Besides, in yet another preferred mode for carrying out the invention, the abnormality detection and suppression system may include terminals for connection of the signal wires of the vibration sensor, the temperature sensor and the strain sensor, respectively, which terminals are provided at the top of the stem, wherein the outer peripheral recess of the stem may be communicated to the signal wire passage by way of a transverse bore, and wherein the signal wires of the temperature sensor and the strain sensor are connected to the associated ones of the terminals for connection via the transverse bore and the signal wire passage, while the signal wire of the vibration sensor is connected to the associated connection terminal via the signal wire passage.

In the abnormality detection and suppression system, the control unit may preferably be implemented in the form of a microcomputer incorporating an interface, a memory and a central processing unit, the memory storing a maximum permissible load for the stem, wherein the driving of the stem for further moving or urging the valve body in the valve opening or closing direction from the fully open position or the fully closed position is performed while comparing the load detected by the strain sensor with the maximum permissible load stored in the memory.

Further, a display unit may be connected to the interface, and unless the leakage can be stopped even when the load applied to the stem has attained the maximum permissible load, corresponding information is stored in the memory so that the information can be outputted onto the display unit.

When fluid leakage takes place through the valve seats in the state where the valve is fully closed, i.e., when the valve body is at the fully closed position, not only the valve body but also the stem coupled integrally to the valve body undergoes vibration due to the fluid leakage. This vibration is detected by the vibration sensor, the output signal of which is supplied to the control unit. In response to this signal, the control unit actuates the driving unit so that the stem is urged or moved in the direction in which the valve is further closed, whereby the leakage through the valve seats is stopped. When the stem is driven in this way, a load, i.e., compression stress, acts on the stem. This load or stress is detected by the strain sensor, the output signal of which is also fed to the control unit. In the memory incorporated in the control unit, a maximum permissible load for the stem is stored. The control unit compares the detected load with the maximum permissible load, for thereby preventing excessively large stress from acting on the valve seats which are thus protected against injury or damage.

On the other hand, when the gland/packing assembly suffers from injury or damage, the fluid flowing through the valve passage will leak through the gland/packing assembly in the state where the valve is fully opened. This leakage brings about a change in temperature of the stem portion at which the temperature sensor is disposed. The temperature change is thus detected by the temperature sensor, the output signal of which is supplied to the control unit. In response to the temperature change signal outputted from the temperature sensor, the control unit makes the decision that leakage occurs through the gland/packing assembly to thereby cause the driving unit to drive the stem in the direction in which the valve body is further moved in the valve opening direction. As a result of this, the valve cover and the counter valve seats (back seats) mounted on the stem acts on the gland/packing assembly so as to stop the leakage through the gland packing assembly. In this case, the load applied to the stem is monitored by the strain sensor for the purpose of protecting the components constituting the gland/ packing assembly as well as the valve cover and the back seats.

DESCRIPTION

The present invention will now be described in detail in conjunction with exemplary or preferred embodiments thereof by reference to the drawings, in which like reference symbols designate like or equivalent parts.

DRAWINGS

REFERENCE NUMERALS

1—valve casing. 1a—valve seats. 1b—inlet passage (fluid passage). 1c—outlet passage (fluid passage). 3—valve body. 3a—valve seats. 4—stem. 4a—threaded portion. 4b—signal wire passage. 4c—peripheral recess. 4d—transverse bore. 4e—frustoconical surface (back seat). 6—vibration sensor. 7—heat insulating material. 8—bonding agent.

9—temperature sensor. 10—strain sensor. 11—coating resin. 12—gland/packing assembly. 12a—gland. 12b—back seat. 12c—concave frustoconical surface (back seat). 13—driving unit. 14—terminals for connection. 15—control unit. 16—central processing unit. 17—memory. 18—interface. 19—display.

PREFERRED EMBODIMENTS

Figure 1:
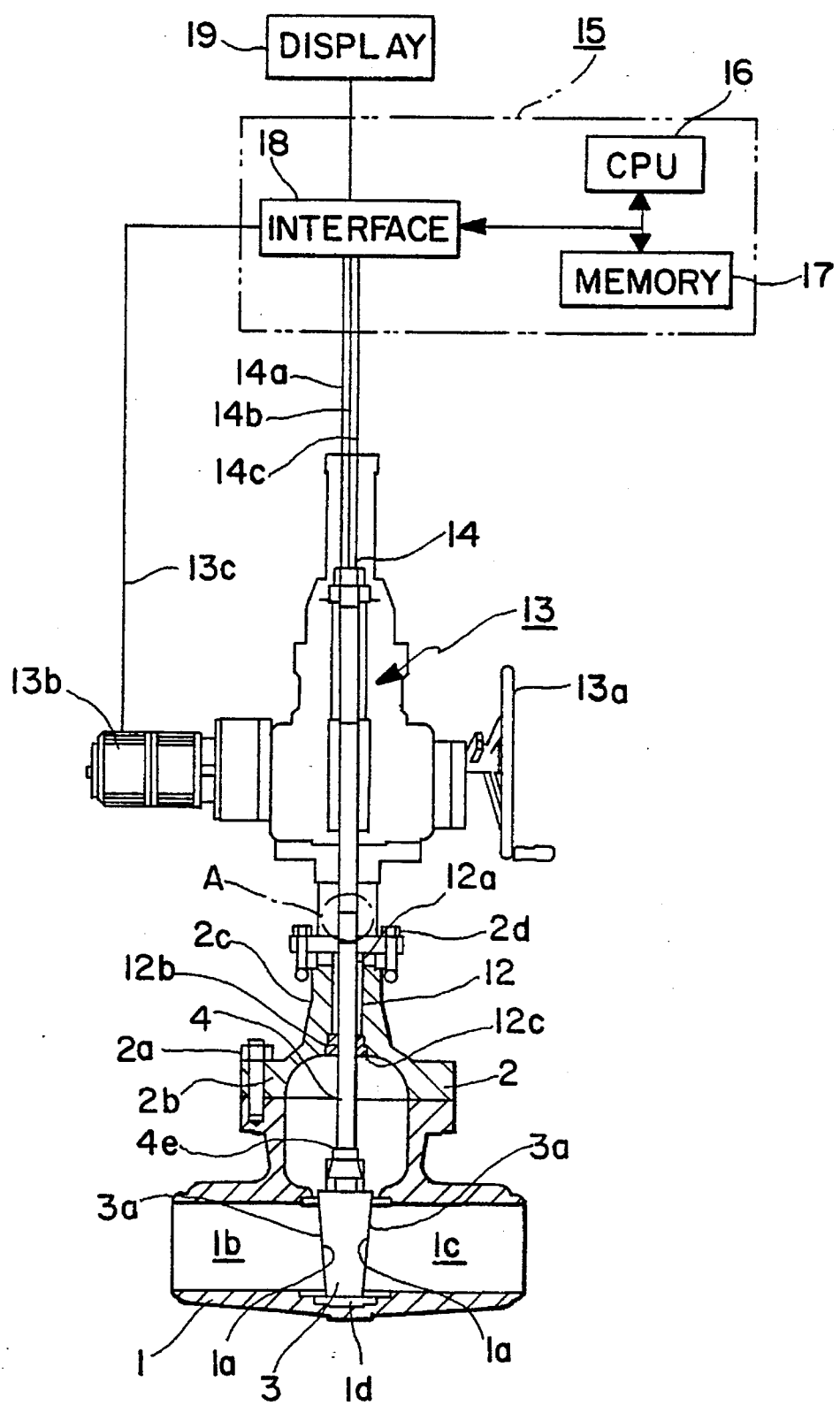
FIG. 1 is a conceptual view showing schematically an abnormality detection and suppression system for a valve apparatus according to the present invention.
Figure 2:
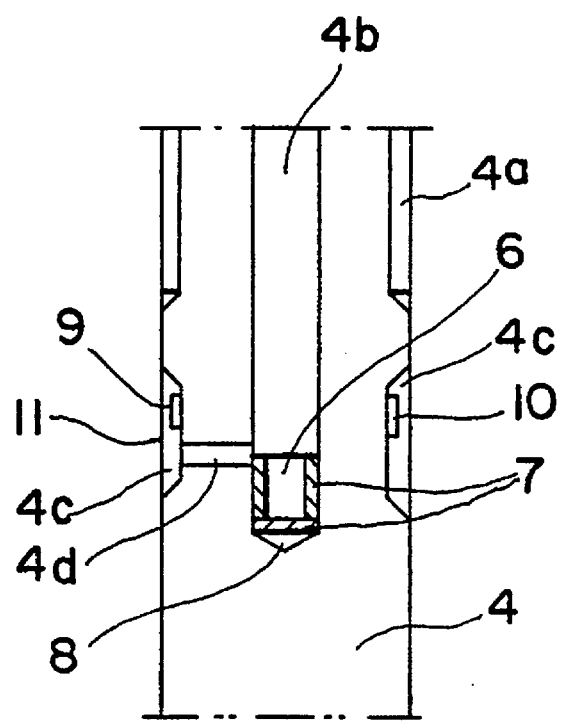
FIG. 2 is an enlarged sectional view of an area A of FIG. 1 showing various sensors installed internally of a valve stem of the valve apparatus shown in FIG. 1.

FIG. 1 is a vertical sectional view showing a typical example of a gate valve which includes a valve stem for moving up and down (i.e., vertically) a valve body against flow of a fluid and in which the teachings of the present invention are embodied. In the figure, a reference numeral 1 denotes a valve casing provided with an inlet passage (constituting a part of fluid passage) 1b and an outlet passage (constituting a part of the fluid passage) 1c. In the inlet passage 1b and the outlet passage 1c, there are mounted at adjacent ends thereof valve seats 1a each of a substantially annular form, respectively. A valve cover 2 is fixedly secured to a top end of the valve casing 1 at a peripheral flange 2b by suitable clamping means such as bolts 2a. A valve body 3 which per se is known in the art is so disposed as to be selectively interposed between the valve seats 1a formed in the valve casing 1 to thereby place the inlet passage 1b and the outlet passage 1c selectively in the communicated or uncommunicated state. Connected integrally to the valve body 3 having valve seats 3a mounted thereon is a stem 4 at a bottom portion thereof through threadwise fitting, by way of example, wherein the stem 4 is equipped with a temperature sensor 9, a strain sensor (strain gauge) 10, a vibration sensor 6 and the like, as is shown in FIG. 2 which shows an area A of FIG. 1 in an enlarged view. Further, there exists no gap between the valve body 3 and the stem 4. Besides, the aforementioned various sensors per se may be conventional ones known in the art. Accordingly, description of these sensors themselves will be unnecessary.

Turning back to FIG. 1, the stem 4 extends upwardly through a gland/packing assembly 12 of a known structure which is disposed within a cylindrical portion 2c of the valve cover 2. The stem 4 protrudes into a driving unit 13 which is fixedly secured to the valve cover 2 at a top end thereof by means of a bolt/nut assembly 2d so that the stem 4 can be driven reciprocatively in the vertical direction by the driving unit 13. To this end, substantially upper half portion of the stem 4 is threaded, as shown at 4a in FIG. 2. On the other hand, the driving unit 13 includes a rotatable member (not shown) which is adapted to engage with the threaded portion 4a so that the stem 4 can be moved in the vertical direction by driving the rotatable number by a manually operated wheel 13a or by means of an electric motor 13b.

In the gland/packing assembly 12, a packing is retained upwardly by an upper gland 12a. The bottom of a lower back-seat 12b is so formed as to define a concave frustoconical surface 12c. On the other hand, a lower portion of the stem 4 is so formed as to have a frustoconical surface 4e which is substantially complementary to the concave frustoconical surface 12c formed in the bottom surface of the back-seat 12b. Thus, when the stem 4 is moved upwardly for moving the valve body 3 to a fully open position (i.e., the position at which the valve apparatus is opened fully), the frustoconical surface 4c of the stem 4 is snugly received in the concave frustoconical surface 12c of the lower gland 12b. These frustoconical surfaces 12c and 4e constitute so-called counter seats (back seats).

The sensors 6, 9 and 10 mentioned previously are installed at positions corresponding to an intermediate portion of the stem 4 located below the threaded portion 4a. More specifically, the vibration sensor 6 is disposed at a bottom of a signal wire passage 4b formed longitudinally at the center of the stem 4 coaxially therewith and fixedly secured by an appropriate bonding agent or adhesive 8 in the state enclosed by a heat insulating material 7. In order to ensure a sufficient bonding strength in securing the vibration sensor 6 to the stem 4 as well as positive protection of the vibration sensor 6 against temperature rise in the stem 4, the heat insulating material 7 and the adhesive 8 mentioned above are injected into the signal wire passage 4b through a transverse bore 4d upon mounting of the vibration sensor 6. As the adhesive 8, a commercially available appropriate bonding agent or adhesive can be used. For the heat insulating material 7, it is found that a non-metallic material of a low thermal conductivity such as a material commercially available under the trade name of "PEEK" is preferred.

The temperature sensor 9 and the strain sensor 10 are embedded within a coating resin (preferably heat resisting resin such as available under the registered trade mark "Teflon") in a recess 4c formed in the outer periphery of the stem 4 at the position mentioned previously in order to ensure protection for the temperature sensor 9 and the strain sensor 10. More specifically, the temperature sensor 9 is mounted adjacent to the strain sensor 10 having a diameter smaller than the outer diameter of the stem 4. The temperature sensor 9 can be calibrated when the stem 4 is manufactured and can serve as a standing or permanent sensor. The peripheral recess 4c is communicated to the signal wire passage 4b by way of the transverse bore 4d. Signal lines or leads (not shown) of the temperature sensor 9 and the strain sensor 10 are led into the signal wire passage 4b by way of the transverse bore 4d and extend to the top end of the stem 4 together with the signal line or lead (also not shown) of the vibration sensor 6 so as to be connected to respective terminals 14. In this conjunction, it should however be mentioned that the temperature sensor 9 and the strain sensor 10 may be mounted in such configuration as to protrude from the outer peripheral surface of the stem 4 in the case where the stem 4 as used is of a small diameter.

By selecting the positions at which the vibration sensor 6, the temperature sensor 9 and the strain sensor 10 are mounted in the manner described above, it is possible to prevent vibration taking place upon movement of the stem 4 from being directly transmitted to these sensors 6, 9 and 10 in contrast to the conventional arrangement in which the temperature sensor is provided at a position in the vicinity of the gland/packing assembly with the vibration sensor being mounted at a top end portion of the valve stem.

As mentioned previously, the valve body 3 exposed to a fluid flowing through the interior of the valve casing 1 is directly connected to the stem 4 in an integrated structure. By virtue of this arrangement, it is possible to positively detect even a small-amplitude vibration of the valve body 3 which may take place in the close state where the valve seats 3a of the valve body 3 are brought into fluid-tight contact with the valve seats 1a of the valve casing 1 due to inter-seat leakage brought abut by insufficiency in the surface contact pressure between the valve seats as caused by insufficiency of the press-down force exerted through the stem 4 and/or lowering of the surface contact pressure between the valve seats as brought abut by a differential pressure between the inlet and outlet passages. The output signal of the vibration sensor indicating the vibration is transmitted to the control unit 15 for the driving unit 13 via the associated connecting terminal 14 provided at the top of the stem 4 to undergo a signal processing in a manner well known in the art together with information furnished by the output signal of the strain sensor 10 which is destined to measure a load applied to the stem 4, whereby system operation control can be achieved in a satisfactory manner.

Again referring to FIG. 2, it should be mentioned that the vibration sensor 6 has to be fixedly or rigidly secured to the stem 4. When the fluid to be handled has a high temperature, rise in temperature of the stem 4 which is brought into contact with the fluid can not be avoided. Accordingly, corresponding measures have to be taken for protecting the vibration sensor 6 against high temperature and mounting the vibration sensor 6 so that it can be maintained stationarily even under the influence of a high temperature. For these reasons, the transverse bore 4d is so formed in the stem 4 as to be communicated with the signal wire passage 4b at the position where the vibration sensor 6 is mounted and utilized for injecting the heat insulating material 7 of low heat conductivity between the vibration sensor 6 and the material of the stem 4 as well as the bonding agent 8 for fixing positively the vibration sensor 6 to the stem 4. The stem assembly manufactured in this manner undergoes a performance test of the vibration sensor 6 before being installed, whereby the driving unit 13 is calibrated by taking into consideration of the performance or characteristics of the vibration sensor 6 as measured for the purpose of establishing properly and correctly the relation between the sensor output signal and a stem driving signal.

The control unit 15 may be implemented in the form of a microcomputer or a personal computer and comprised of a central processing unit (CPU) 16, a memory 17 and an interface 18. Signal lines 14a, 14b and 14c extending from the connecting terminals 14 provided at the top end of the stem 4 as well as other signal lines are connected to the interface 18. Thus, the control unit 15 is supplied with the output signals of the vibration sensor 6, the temperature sensor 9 and the strain sensor 10 via the signal lines 14a, 14b and 14c and the interface 18. Additionally, a signal line 13c leading to the driving unit 13 is connected to the interface 18 so that actuation and operation of the driving unit 13 can be controlled by the control unit 15.

Next, description will be directed to operation of the abnormality detection and suppression system for the valve apparatus according to the present invention. When the valve apparatus is closed in the state in which a fluid such as steam of high temperature and high pressure is flowing through the valve, the stem 4 tends to expand in the direction in which the valve body 3 is urged toward the closed position, because a portion of the stem 4 is exposed to the fluid of high temperature and pressure together with the valve body 3. On the other hand, when the valve apparatus is cooled due to interruption of the fluid flow upon closing of the valve apparatus, the valve casing 1 tends to contract in the direction in which the valve seats 1a formed in the fluid passages of the valve casing 1 are moved toward each other. Consequently, the valve body 3 will be embraced by the valve seats 1a more tightly, presenting an obstacle to the valve opening operation. However, with the arrangement of the abnormality detection and suppression system according to the invention in which the temperature of the stem 4 is monitored by the temperature sensor 9 while the load applied to the stem 4 is monitored by the strain sensor (e.g. strain gauge) 10, it is possible to arithmetically determine magnitude of the expansion of the stem 4 due to the temperature rise of the stem 4, to thereby move upwardly or lift the stem 4 by a distance corresponding to the expansion as determined, whereby the valve body 3 is prevented from being stickily embraced or sandwiched between the valve seats 1a in the valve closed position. At that time, the load applied to the stem 4 upon lifting thereof is monitored by the strain sensor 10 for thereby controlling the driving unit 13 so that the inter-seat leakage due to insufficiency of the surface contact pressure between the valve seats 1a and 3a is prevented from occurrence. Owing to these features, no obstacle will be encountered in the valve opening operation even when the valve casing 1 is cooled in the closed state of the valve apparatus.

When the valve apparatus is closed, some of the fluid will be trapped within a space 1d defined between the bottom end of the valve body 3 and a bottom surface of the valve casing 1. In that case, when the valve casing 1 is warmed upon restarting of operation of equipment in which the valve apparatus is installed, the fluid resident in the space 1d is heated and vaporized. In that case, the vapor can find no place for escape. As a consequence, the valve body 3 tends to be urged in the closing direction, i.e., sandwiched more forcibly between the valve seats, which will aggravate the difficulty encountered in the operation for opening the valve. This phenomenon is frequently experienced in many applications of the valve apparatus which the invention concerns. However, according to the present invention, this problem can satisfactorily be coped with by the arrangement in which the temperature sensor 9 and the strain sensor 10 are provided in association with the stem 4 for detecting the temperature rise of the stem 4 and the load applied thereto, and it is possible to control the movement of the stem 4 by taking into consideration the temperature rise and the load, whereby the event or phenomenon that the valve body 3 tends to be locked in the state embraced by the valve seats can positively be suppressed throughout all the phases of operation.

Additionally, it is important to note that when the inter-seat leakage mentioned previously occurs, the valve body 3 tends to vibrate due to the leakage, the vibration being transmitted to the stem 4 and other elements provided integrally with the valve body 3. Thus, the vibration sensor 6 detects this vibration, and the detection signal outputted from the vibration sensor 6 is sent to the control unit 15 which responds thereto by controlling the electric motor 13b of the driving unit 13 via the interface 18 to drive the stem 4 so that the valve body 3 is further moved in the closing direction until the leakage makes disappearance. As a result of this, a load is applied to the stem 4. This load is detected by the strain sensor 10, whereby a signal representing the load as detected by the strain sensor 10 is supplied to the central processing unit 16 via the interface 18. The load detection signal is then compared with a maximum permissible load stored in the memory 17 by the central processing unit 16. Unless the leakage is stopped nevertheless of the maximum permissible load being applied to the stem 4, i.e., when the vibration sensor 6 still detects the vibration notwithstanding of application of the maximum permissible load to the stem 4, the central processing unit 16 stores corresponding information indicating this event in the memory 17. This information can be read out from the memory 17 to be displayed on a display unit 19 such as a CRT (Cathode Ray Tube) display via the interface 18, as occasion requires. In other words, the information can be made use of as indication of possibility of the valve seat being injured or damaged in the maintenance of the valve apparatus performed as a part of routine inspection in the state where the plant is shut down.

On the other hand, fluid leakage through the gland/packing assembly 12 in the valve open state is monitored by the temperature sensor 9. More specifically, the temperature sensor 9 monitors the temperature of the stem 4, and the detection signal outputted from the temperature sensor 9 is supplied to the control unit 15. In the control unit 15, the central processing unit 16 makes decision on the basis of the detection signal inputted as to whether or not magnitude of change in the temperature of the stem 4 exceeds a predetermined reference or standard range stored in the memory 17. When this decision results in affirmation, it is then determined that the leakage of concern takes place. Thus, the control unit 15 issues a command to drive the stem 4 for causing the valve body 3 in the fully open state to move upwardly until the magnitude of the steam temperature change falls within the reference range. When the valve body 3 is in the fully open state, the frustoconical surface 4e formed in the stem 4 is snugly received in the concave frustoconical surface 12c formed in the bottom surface of the back-seat 12b, as mentioned previously. Accordingly, the driving of the stem 4 in the manner mentioned above brings abut an increase in the load (surface contact pressure) applied to the concave frustoconical surface 12c and the frustoconical surface 4e (i.e., back seats), whereby the aforementioned leakage is prevented. In this way, the leakage through the gland/packing assembly 12 can be suppressed by detecting the temperature of the stem 4 and feeding back the detection signal as a signal indicating or commanding an axial displacement of the stem 4. When the leakage through the gland/packing assembly 12 can not be prevented, information indicating defect or abnormality of the gland/packing assembly 12 may be stored in the memory 17 to be made use of in the maintenance or service of the gland/packing assembly 12 in the routine inspection performed by shutting down the plant as mentioned hereinbefore in conjunction with the leakage through the valve seats.

At this juncture, it should be mentioned that in the case of the existing valve apparatus, the back seats (i.e., the concave frustoconical surface 12c and the frustoconical surface 4e) which serve for preventing the leakage through the gland/packing assembly 12 are constantly maintained in the acting or operating state even when no leakage takes place. As a result of this, these parts or portions are often injured prematurely and can play no role at a critical moment at which the leakage must be stopped, presenting a cause for trouble. In contrast, according to the invention, the back-seat 12b of the gland/packing assembly 12 is clamped to an extent as needed, which can be determined by monitoring the temperature change of the stem 4. Thus, the gland/packing assembly 12 can be protected against deterioration as a function of time lapse, as compared with the prior art valve apparatus, whereby likelihood of trouble occurrence can correspondingly be diminished.

Further, it has been observed in the existing valve apparatus that when the valve closing operation is started from a high-temperature state, the span between both the valve seats attached to the valve casing tends to be shortened due to the contraction of the valve casing because of lowering of the temperature of the valve casing after the valve closing, whereby the valve body is stickily embraced by the seats. Thus, a fault of impossibility of opening the valve is often experienced in the existing valve apparatus. In contrast, in the case of the valve apparatus according to the present invention which features the arrangement that the stem and the valve body are moved as an integral structure and the arrangement that the temperature change of the stem and variation in the load applied to the stem are detected by the temperature sensor 9 and the strain sensor 10, respectively, even minute displacements of the stem occurring in accompanying valve closing/opening operations can be detected as a change in the load applied to the stem by the strain sensor 10. Thus, on the basis of the detection signal delivered from the strain sensor 10, it is checked whether an excessive large load (push-in of the valve body to the embraced state) or an excessively small load (surface contacting pressure low enough to bring about the leakage) is applied to the stem, whereon the most appropriate valve position is established by manipulating the valve/stem assembly in dependence on the load applied to the stem, to thereby prevent the valve embrace phenomenon and hence trouble from occurrence.

As will now be appreciated from the foregoing description, by virtue of the arrangement taught by the present invention that not only the vibration sensor, the temperature sensor and the strain sensor are provided internally of the valve stem but also these sensors are electrically connected to an external control unit for actuating the driving unit in response to the output signals of the various sensors representing information of the corresponding states prevailing internally of the valve apparatus for thereby controlling the valve stem and the valve body, the leakage through the gland/packing assembly can positively be prevented, whereby a fault possibly brought about by the vibration of the valve as well as abnormalities such as locking of the valve body in the closed state, can be prevented from occurrence. Additionally, by storing in the memory of the control unit the information of the load applied to the stem when the above-mentioned leakage can be stopped, it is possible to know the extent of deterioration which the valve body undergone in the course of time lapse by referencing the information as stored.

In the existing valve apparatus, the action of the back seats for preventing the leakage through the gland/packing assembly is maintained constantly even in the state where the leakage through the gland/packing assembly does not occur. As a consequence, the back seats are likely to be injured, giving rise to a problem that the back seats are of no use at a critical time. In contrast, in the valve apparatus according to the invention, the back seats are applied with the surface contact pressure only upon occurrence of the leakage through the gland/packing assembly as detected by processing the signal indicating the temperature of the valve stem. Consequently, likelihood of the back seats being deteriorated as a function of time lapse can considerably be decreased in the valve apparatus according to the invention when compared with the conventional one. Thus, the invention provides a valve apparatus which is improved significantly in respect to the insusceptibility to occurrence of troubles.

Further, in the case of the existing valve apparatus installed in a nuclear power plant where a fluid of high pressure and high temperature is handled, the valve closing operation is accompanied with lowering of the temperature of the valve casing through which the high temperature/high pressure fluid has flown, as a result of which the inter-seat distance is reduced, whereby the valve body is stickily embraced by the valve seats, giving rise to difficulty in reopening the valve apparatus. In contrast, in the valve apparatus according to the invention in which the variation in the stem temperature and that of load applied to the stem in the state where the valve is closed, such valve embracing phenomenon can be prevented from occurrence by performing the valve control in dependence on the changes in the stem temperature and the stem in the valve closed state. It is thus apparent that the invention provides a valve apparatus imparted with the sophisticated function, i.e., the self-diagnosis and self-remedy function.

What is claimed is:

1. In a valve apparatus including a valve casing which defines therein a fluid passage having first valve seats mounted therein, a valve body movable between a fully open position and a fully closed position for selectively opening or closing said fluid passage to fluid flow thru said valve apparatus, said valve body having second valve seats mounted thereon and adapted to selectively engage with said first valve seats in a fluid-tight manner in a leak-free valve apparatus, a stem having one end portion coupled to said valve body integrally therewith and the other end portion extending through a gland/packing assembly installed around said valve stem in said valve casing to the exterior thereof, and a driving unit operatively coupled to said stem at a location externally of said valve casing so as to move said valve body between the two extreme, intended modes of said fully open position and said fully closed position, or in the event of a leak condition that said valve body assumes a position only partially fully-open or partially fully-closed, respectively, to move said valve body towards said fully-open position or fully-closed position; an abnormality detection and suppression system, characterized in that a vibration sensor, a temperature sensor and a strain sensor are disposed internally of said stem at a portion thereof which is located outside of said valve casing when said valve body is intentionally moved to said fully closed position, and that a mini-computer control unit is disposed externally of said valve casing and adapted to receive output signals from said vibration sensor, said temperature sensor and said strain sensor, wherein when said valve body should occupy the presumed position corresponding to the intended said fully closed position, substantially a partially fully-closed position, said control unit responds to the output signal of said vibration sensor indicating occurrence of vibration brought abut by leakage passing through the presumedly sealingly-engaged said first and second valve seats to thereby actuate and control said driving unit such that said valve body is further urged and driven in the valve closing direction towards the said fully closed position by means of said stem while monitoring simultaneously a load applied to said stem with said strain sensor until substantially no vibration is detected by said vibration sensor, thereby indicating cessation of the prior leak condition at said valve seats; and whereas when said temperature sensor detects a temperature change due to leakage flow in the state in which said valve body is disposed to occupy the assumed position corresponding to the intended said fully open position, it releases an output signal that triggers a leakage failure condition in the control unit, whereupon said control unit responds to the output signal of said temperature sensor indicating occurrence of leakage through said gland/packing assembly to thereby actuate said driving unit such that said valve body is further driven in the valve opening direction towards said fully open position by means of said stem while monitoring simultaneously a load applied to said stem with said strain sensor until said temperature change and output signal substantially disappear, thereby also indicating cessation of the prior leak condition in said valve apparatus.

2. An abnormality detection and suppression system for a valve apparatus as set forth in claim 1, characterized in that said other end portion of said stem at which said driving unit is operatively coupled to said stem is implemented in a threaded portion formed in the outer peripheral surface of said stem, with said threaded portion having an upper and lower end thereon, and that said temperature sensor and said strain sensor are disposed within an outer peripheral recess formed in said stem at a position in the vicinity of a lower end of said threaded portion and covered by a coating material applied therearound said temperature sensor and strain sensor.

3. An abnormality detection and suppression system for a valve apparatus as set forth in claim 2, characterized in that a signal wire passage is formed in a center portion of said stem so as to extend coaxially with said stem from a position close to the lower end of said threaded portion to the top of the other end portion of said stem and that said vibration sensor is fixedly secured to the bottom of said signal wire passage by using an adhesive and enclosed by a heat insulating material.

4. An abnormality detection and suppression system for a valve apparatus as set forth in claim 3, characterized in that terminals for connection for signal wires of said vibration sensor, said temperature sensor and said strain sensor, respectively, are provided at the top of said stem, that said outer peripheral recess of said stem is communicated to said signal wire passage by way of a transverse bore placed thru the stem for electrical routing of said signal wires, and that the signal wires of said temperature sensor and said strain sensor are connected to the associated ones of said terminals via said transverse bore and said signal wire passage, while the signal wire of said vibration sensor is connected to the associated terminal via said signal wire passage.

5. An abnormality detection and suppression system for a valve apparatus as set forth in claim 1, characterized in that said control unit is implemented in the form of a microcomputer incorporating an interface, a memory and a central processing unit, said memory storing a maximum permissible load for said stem during moving of said valve body between the fully-open position and the fully-closed position, and that driving of said stem for further urging said valve body in the valve opening or closing direction towards said fully open position or said fully closed position is performed while comparing the load detected by said strain sensor with said maximum permissible load read out from said memory.

6. An abnormality detection and suppression system for a valve apparatus as set forth in claim 5, characterized in that a display unit is connected to said control unit via said interface, and that when the leakage can not be stopped even when the load applied to said stem by said driving unit has attained said maximum permissible load, corresponding information is stored in said memory so that said information concerning the continuing leakage condition failure can be outputted onto said display unit.

7. A stem assembly for a valve with an associated valve casing and valve body, comprising a stem passing therethru having one end portion coupled integrally to a valve body of said valve having a signal wire passage disposed thru said stem for electrical interconnection routing of conductive signal wires and having the said other end portion provided with terminals for electrical connection, wherein a temperature sensor, a vibration sensor and a strain sensor are disposed internally of said stem in a portion thereof lying outside of a valve casing of said valve when said valve body is at a fully closed position of said valve, with said temperature sensor, said vibration sensor and said strain sensor being electrically connected via said conductive signal wires to said terminals, respectively.

* * * * *